United States Patent
Dillig et al.

(10) Patent No.: US 9,318,969 B2
(45) Date of Patent: Apr. 19, 2016

(54) FREQUENCY CONVERTER WITH DC LINK CAPACITOR AND METHOD FOR PRE-CHARGING THE DC LINK CAPACITOR

(71) Applicant: Siemens Aktiengesellschaft, München (DE)

(72) Inventors: Reinhold Dillig, Memmelsdorf (DE); Hubert Schierling, Erlangen (DE); Thomas Schwinn, Herzogenaurach (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 134 days.

(21) Appl. No.: 13/930,561

(22) Filed: Jun. 28, 2013

(65) Prior Publication Data

US 2014/0003099 A1    Jan. 2, 2014

(30) Foreign Application Priority Data

Jun. 29, 2012  (EP) .................................... 12174382

(51) Int. Cl.
*H02J 3/36* (2006.01)
*H02M 5/458* (2006.01)

(52) U.S. Cl.
CPC ..................... *H02M 5/458* (2013.01)

(58) Field of Classification Search
USPC ....................... 363/34–37; 323/222
See application file for complete search history.

(56) References Cited

U.S. PATENT DOCUMENTS

| | | | |
|---|---|---|---|
| 4,978,829 A * | 12/1990 | Gurwicz | 219/69.13 |
| 6,330,170 B1 * | 12/2001 | Wang et al. | 363/37 |
| 6,760,239 B2 | 7/2004 | Schierling | |
| 6,850,424 B2 | 2/2005 | Baudelot et al. | |
| 6,862,163 B2 | 3/2005 | Schierling et al. | |
| 6,914,397 B2 | 7/2005 | Schierling | |
| 7,301,736 B2 | 11/2007 | Schierling et al. | |
| 7,327,053 B2 | 2/2008 | Eckardt et al. | |
| 7,394,627 B2 | 7/2008 | Bruckmann et al. | |
| 7,489,124 B2 | 2/2009 | Schierling | |
| 7,529,111 B2 | 5/2009 | Schierling | |
| 7,622,886 B2 | 11/2009 | Schierling | |
| 7,652,585 B2 | 1/2010 | Schierling | |
| 7,825,533 B2 | 11/2010 | Schierling | |
| 2005/0067906 A1 | 3/2005 | Schierling et al. | |
| 2006/0187085 A1 | 8/2006 | Griepentrog et al. | |
| 2007/0053213 A1 | 3/2007 | Brune et al. | |

(Continued)

FOREIGN PATENT DOCUMENTS

DE    19 739 553 A1    3/1999
DE    198 25 801 A1    12/1999

(Continued)

*Primary Examiner* — Nguyen Tran
(74) *Attorney, Agent, or Firm* — Henry M. Feiereisen LLC

(57) ABSTRACT

A frequency converter has an AC-DC converter and an inverter interconnected via a DC link having a first and a second circuit branch interconnected by a DC link capacitor and a commutation capacitor. To protect the AC-DC converter from damage caused by an overcurrent, the first circuit branch includes a choke in which a capacitor-side terminal is connected to a terminal of the DC link capacitor and a switch-side terminal is connected via a semiconductor switch to a DC link terminal of the AC-DC converter and also via a freewheeling diode to the second circuit branch. The semiconductor switch is configured to control a magnitude of an electric current flowing from the AC-DC converter into the DC link capacitor in accordance with a control signal.

17 Claims, 4 Drawing Sheets

(56) References Cited

U.S. PATENT DOCUMENTS

| | | | |
|---|---|---|---|
| 2008/0068870 A1* | 3/2008 | Eguchi et al. | 363/37 |
| 2008/0094864 A1* | 4/2008 | Sekimoto et al. | 363/36 |
| 2008/0191356 A1 | 8/2008 | Leibold et al. | |
| 2008/0310202 A1 | 12/2008 | Schierling | |
| 2009/0243558 A1 | 10/2009 | Henze | |
| 2011/0007530 A1* | 1/2011 | Swamy et al. | 363/37 |
| 2011/0043082 A1 | 2/2011 | Billmann et al. | |
| 2011/0187480 A1 | 8/2011 | Schierling et al. | |

FOREIGN PATENT DOCUMENTS

| | | |
|---|---|---|
| DE | 203 11 104 U1 | 9/2003 |
| DE | 10248971 A1 | 5/2004 |
| DE | 10 2009 032 259 A1 | 1/2011 |
| EP | 1 808 953 A1 | 7/2007 |

* cited by examiner

FREQUENCY CONVERTER WITH DC LINK CAPACITOR AND METHOD FOR PRE-CHARGING THE DC LINK CAPACITOR

CROSS-REFERENCES TO RELATED APPLICATIONS

This application claims the priority of European Patent Application, Serial No. 12174382, filed Jun. 29, 2012, pursuant to 35 U.S.C. 119(a)-(d), the content of which is incorporated herein by reference in its entirety as if fully set forth herein.

BACKGROUND OF THE INVENTION

The present invention relates to a frequency converter with DC link capacitor and method for pre-charging the DC link capacitor. The invention also relates to a frequency converter for operating an electrical machine on an electrical supply system.

The following discussion of related art is provided to assist the reader in understanding the advantages of the invention, and is not to be construed as an admission that this related art is prior art to this invention.

A frequency converter includes typically an AC-DC converter, an inverter and a DC link connecting the AC-DC converter to the inverter. At least one DC link capacitor is provided in the direct-current link, or DC link for short. The invention also relates to a method for charging the DC link capacitor, also described as pre-charging.

The basic mode of operation of a frequency converter is explained in detail below with reference to the schematic diagram in FIG. 1. With a frequency converter 10, electrical energy can be exchanged between an AC supply system, or simply described below as a supply system 12, and an electrical machine 14. The electrical machine 14 can be operated as an electric motor or as a generator. Accordingly, the exchange of electrical energy takes place either from the supply system 12 to the machine 14, or vice versa.

It is possible with the frequency converter 10 to effect on the one hand a conversion between an AC supply voltage having a specified mains frequency (for example 230V, 50 Hz) and on the other hand an AC voltage having an optional frequency required for the operation of the electrical machine 14. For this, a line-side AC-DC converter 16 of the frequency converter 10 converts between the AC supply voltage and a DC voltage $U_{ZK}$, which exists between two electrical circuit branches ZK+ and ZK- of a DC link 18. The circuit branches ZK+ and ZK- connect the AC-DC converter 16 to an inverter 20. They usually contain busbars. The inverter 20 converts between the DC voltage $U_{ZK}$ and an AC voltage for the electrical machine 14.

As shown here, the supply system 12 can be a three-phase system with three line phases R, S, T. However, the supply system 12 can also be a two-phase supply system. The electrical machine 14 can also be a machine with any number of phases. A three-phase AC machine is shown here.

A DC link capacitor 22 in the DC link 18 has a sufficiently large capacitance in order to smooth the ripple on the DC voltage $U_{ZK}$ produced during one of the described conversion steps so that it does not influence the other conversion step. For this, the DC link capacitor is connected between the two circuit branches ZK+, ZK-. The capacitance of the DC link capacitor is preferably also sufficiently large to facilitate uninterrupted operation of the electrical machine 14 in the event of a short-term failure of the AC supply voltage for a few milliseconds.

Line-side chokes $L_1$, $L_2$, $L_3$ can be connected upstream of the AC-DC converter 16. These prevent parasitic signals produced by the AC-DC converter 16 during voltage conversion from being transmitted as harmonics into the supply system 12. The chokes $L_1$, $L_2$, $L_3$ can have a further function if the AC-DC converter 16 is operated as a step-up converter which produces a DC voltage $U_{ZK}$ having an r.m.s. value which is independent of the r.m.s. value of the line voltage. The chokes $L_1$, $L_2$, $L_3$ are then embodied as commutation inductors which prevent short-circuits between the individual line phases R, S, T in the AC-DC converter 16 produced in a switched-mode operation of the AC-DC converter 16, from resulting in a critical commutation magnitude.

In order to operate the electrical machine 14 as a motor for example, the AC-DC converter 16 is electrically connected to the line phases R, S, T of the supply system 12 by closing a main contactor 24. Accordingly, the AC-DC converter 16 produces the DC voltage $U_{ZK}$, for example by full-wave rectification, which charges the DC link capacitor 22. This charging process is described in the following as the pre-charging phase.

The electrical machine 14 can be put into service after the DC link capacitor 22 has been charged up to the level at which the DC voltage $U_{ZK}$ reaches a desired value. In addition, the inverter 20 generates in this case a three-phase alternating voltage from the DC voltage $U_{ZK}$, so that a three-phase current flows in the electrical machine 14. This process is described in the following as the operating phase. The frequency of the three-phase current can be set in the inverter 20.

The DC link capacitor is usually not charged up before the main contactor is closed. This gives rise to the problem in the pre-charging phase that after the main contactor is closed, the magnitude of the charging current flowing from the supply system into the uncharged DC link capacitor is so high due to its large capacitance, that components of the AC-DC converter are damaged.

It would therefore be desirable and advantageous to obviate other prior art shortcomings and to provide adequate protection for the AC-DC converter of a frequency converter.

SUMMARY OF THE INVENTION

According to one aspect of the present invention, a frequency converter for operating an electrical machine on an electrical supply system includes an AC-DC converter having an AC input connected to the electrical supply system and a DC output, an inverter having a DC input and an AC output connected to a load, and a DC link having a first circuit branch and a second circuit branch interconnecting the DC output of the AC-DC converter and the DC input of the inverter. The DC link includes a DC link capacitor connecting the first circuit branch and the second circuit branch across the DC input of the inverter. The first circuit branch includes a choke having a first terminal connected to a DC input terminal of the inverter and a second terminal connected to a first terminal of a freewheeling diode and to a first terminal of a semiconductor switch. A second terminal of the semiconductor switch is connected to a DC terminal of the AC-DC converter in the first circuit branch, wherein a second terminal of the freewheeling diode is connected to the second circuit branch. The semiconductor switch is configured to control a magnitude of an electrical current flowing from the AC-DC converter into the DC link capacitor in accordance with a control signal.

According to another aspect of the present invention, a method for operating a frequency converter having an AC-DC converter, an inverter and a DC link interconnecting a DC output of the AC-DC converter with a DC input of the inverter includes the steps of coupling the AC-DC converter to a supply system, and in a pre-charging phase, charging a DC link capacitor via a semiconductor switch, when the semiconductor switch is conducting current, with electrical energy from the supply system by controlling a magnitude of a charging current flowing through the semiconductor switch and a choke with a control signal supplied at a control input of the semiconductor switch, and charging the DC link capacitor via a freewheeling diode when the semiconductor switch is not conducting. During an operating phase, the semiconductor switch interrupts a short-circuit current from the supply system in the event of a fault.

The two terminals of the choke are referred to below as the capacitor-side and switch-side terminals, respectively.

The semiconductor switch is embodied so as to control a magnitude of an electrical current flowing from the AC-DC converter into the DC link capacitor in accordance with a control signal. Correspondingly, to charge up the DC link capacitor in the pre-charging phase according to the inventive method, the AC-DC converter is initially coupled to the supply system and the DC link capacitor is then charged up with electrical energy from the supply system. In this case, a mean magnitude of an electric current flowing from the AC-DC converter into the DC link capacitor, that is to say a charging current of the DC link capacitor, is controlled by a control device by generating a control signal at a control input of the semiconductor switch.

In the inventive frequency converter, the charging current of the DC link capacitor in the pre-charging phase and also in the initially uncharged DC link capacitor may advantageously be controlled in relation to its magnitude. This may therefore prevent a mean magnitude of the charging current from exceeding a critical value, which would cause destruction of components of the AC-DC converter. A time-dependent change in the magnitude is likewise limited by the choke. Consequently, it is not necessary for the semiconductor switch to operate particularly rapidly, for example in a pulse-width modulated switching mode. A switching rate of 1 kHz to 20 kHz may therefore suffice. In this case no critical voltage is induced by the choke. If the semiconductor switch is opened, the current through the choke is not abruptly interrupted since, instead, this is conducted across the semiconductor switch via the freewheeling diode.

However, the AC-DC converter may be effectively protected by the inventive frequency converter not only during charging of the DC link capacitor. In the event of a fault, for example a bridge short-circuit in the converter or a breakdown in the DC link, the semiconductor switch may isolate a short-circuit current from the supply system and thus protect the AC-DC converter from secondary damage during the operating phase.

To generate the control signal for the semiconductor switch, the control device may advantageously be embodied so as to generate the control signal in accordance with a measured variable which is dependent upon an operating state of the frequency converter. For example, a voltage drop across the DC link capacitor may be measured and its charging current taken into account by the controller. Such control enables the current flowing through the AC-DC converter to be constantly maintained below the critical value, even if the DC link capacitance is unknown or where electrical loads are connected (for example a switched-mode power supply feeding a control device of the frequency converter). The control of the charging current may be based on a two-step control method for example.

A clocked, in particular a pulse-width modulated signal, may be transmitted as a control signal to the control input of the semiconductor switch. The power dissipation converted in the semiconductor switch, and therefore the thermal loading of the semiconductor switch, may be kept low by such signals.

As an alternative to the clocked mode, the semiconductor switch may also be operated as a controllable current source by a suitable control signal. In this case, an (instantaneous) magnitude of a load current flowing through the semiconductor switch is controlled by adjusting the control signal. A load current is understood to be the collector-emitter current of a bipolar transistor and the drain-source current of an FET. When operating as a controllable current source, the magnitude of the load current is virtually independent of the voltage drop across the semiconductor switch in the direction of flow of the load current. Instead, the magnitude is adjustable via the control signal, that is to say a set control voltage or the set control current, at the control input (base or gate) of the semiconductor switch. In the case of a bipolar transistor, this mode of operation corresponds to operation in the active or forward region and in the case of an FET operation in the saturation region.

The semiconductor switch may contain a transistor. Since, because of the choke, this does not need to switch particularly rapidly, a more economical Si transistor, i.e. a transistor based on silicon, may be used. For special cases the semiconductor switch may also be a SiC MOSFET (SiC=silicon carbide; MOS=metal oxide semiconductor; FET=field effect transistor) or a SiC JFET (JFET=junction FET). SiC-based transistors are very heat resistant.

The semiconductor switch is advantageously self-blocking, that is to say it is in a blocking state with a control voltage of 0 V. As a result, this advantageously prevents an uncontrolled current from flowing into the DC link in the event of failure of the control device for the semiconductor switch.

The semiconductor switch need not consist of a single component. It may also contain a cascode circuit comprising a MOSFET and a JFET, for example. This then offers the advantage that a self-blocking semiconductor switch is provided in the DC link of the frequency converter, in which a junction of the MOSFET is protected against damage by an overvoltage. The manufacture of the JFET is preferably based on silicon carbide (SiC).

In order to facilitate a current flow from the inverter to the AC-DC converter, as occurs in a generator mode of an electrical machine connected to the frequency converter, the choke may be shunted by a diode in which the conducting direction is oriented from the inverter to the AC-DC converter. The inductance of the choke then has no influence on the current flow in the generator mode.

According to another advantageous feature of the present invention, in addition, an electromagnetic switch may provided in the DC link to shunt the semiconductor switch and/or the choke. Then in the operating phase the power dissipation in the DC link may be reduced by closing the mechanical switch.

Advantageously, in the DC link the inventive frequency converter has in addition a commutation capacitor which provides commutation capacitance for the AC-DC converter. In this case the semiconductor switch is connected between the commutation capacitor and the DC link capacitor. In other words, the commutation capacitor is electrically connected to the AC-DC converter, even with the semiconductor switch opened (blocking). Here commutation capacitance means a capacitance value that is considerably smaller than the capacitance value of the DC link capacitor. The commutation capacity preferably amounts to less than ten percent, in particular less than one percent of the DC link capacitance. The amount of commutation capacitance may also be chosen in accordance with an inductance value of the chokes already described and/or the inductance of the supply system to which the frequency converter is connected.

With the commutation capacitance, an induction voltage which occurs during switching of components of the infeed transformer, may be permanently maintained below a voltage value that is critical for the serviceability of the frequency converter. Making the commutation capacitance very much smaller than the capacitance of the DC link capacitor ensures that the infeed transformer is not damaged by a load current of the commutation capacitor when the main contactor is closed.

With the existing commutation capacitor, the DC link capacitor may be charged up as follows in several successive recharging cycles. With the semiconductor switch in the blocking state, in each recharging cycle the commutation capacitor is initially charged with electrical energy from the supply system. The energy is then transferred from the commutation capacitor to the DC link capacitor by switching the semiconductor switch to a conducting state.

The semiconductor switch is also designed for alternate interruption of a current flowing from the infeed transformer to the inverter. In other words, the semiconductor switch is then not only connected upstream of the DC link capacitor itself. Instead, it is connected in the DC link so that it may also interrupt the current flow to the inverter. The semiconductor switch is additionally used in the event of a fault to disconnect the DC link (and the inverter and an electrical machine connected to it). Here the induction of an overvoltage may of course occur due to the inductance of the supply system and possibly of the commutation chokes.

Usefully, an additional commutation capacitor which may be connected by a switch is therefore provided in the DC link. In the closed state, the switch electrically connects one terminal of the additional commutation capacitor to the DC link. This additional commutation capacitor may then be connected as required so that the electrical voltage at the permanently connected commutation capacitor is not unduly high and damages said capacitor or the semiconductor switch. The switch for the additional commutation capacitor may be constructed as an electromechanical switch or as an electrical switch.

An electrical resistor may be connected in parallel with the switch. Pre-charging and discharging of the additional commutation capacitor is then possible with the switch open. In this case the magnitude of the current may be determined via the resistance value of the resistor. At least one discharge resistor may also be connected in parallel with the additional commutation capacitor. The electrical energy stored in the additional commutation capacitor following an emergency shutdown then no longer has to be fed back into the DC link, but may be reduced via the parallel resistor.

A diode may also be connected in parallel with the switch to discharge the additional commutation capacitor. The discharge rate is then higher than when discharging via a resistor.

A diode connected in series with the switch may prevent the additional commutation capacitor from discharging via the switch, so that this is protected against overheating.

The capacitor-side terminal of the choke may likewise be connected to the additional commutation capacitor via a diode. In this embodiment, the diode conducts current from the capacitor-side terminal to the additional commutation capacitor. The advantage here is that, like the DC link capacitor, the additional commutation capacitor may be pre-charged via the choke.

As an alternative to an additional commutation capacitor or additionally thereto, protection for the DC link capacitor against an overvoltage during an emergency stop may also be achieved with the semiconductor switch. According to an advantageous embodiment of the inventive method, the semiconductor switch is initially opened to abort an operating phase in order to interrupt current flow from the AC-DC converter to the DC link capacitor and to the inverter. The voltage drop across the commutation capacitor or the semiconductor switch is then established. If the value of this established voltage is higher than a predetermined threshold value, the semiconductor switch is again closed. Consequently, electrical charge may flow out from the commutation capacitor into the DC link capacitor so that the voltage at the commutation capacitor falls. Since the capacitance of the DC link capacitor is signifimaytly higher, in this case the voltage rise at the DC link capacitor is only comparatively small. The semiconductor switch may be temporarily closed again many times during the disconnection process, for example for less than 1 second, in particular less than 100 ms. The closing and re-opening of the semiconductor switch may be realized in relation to the established voltage.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
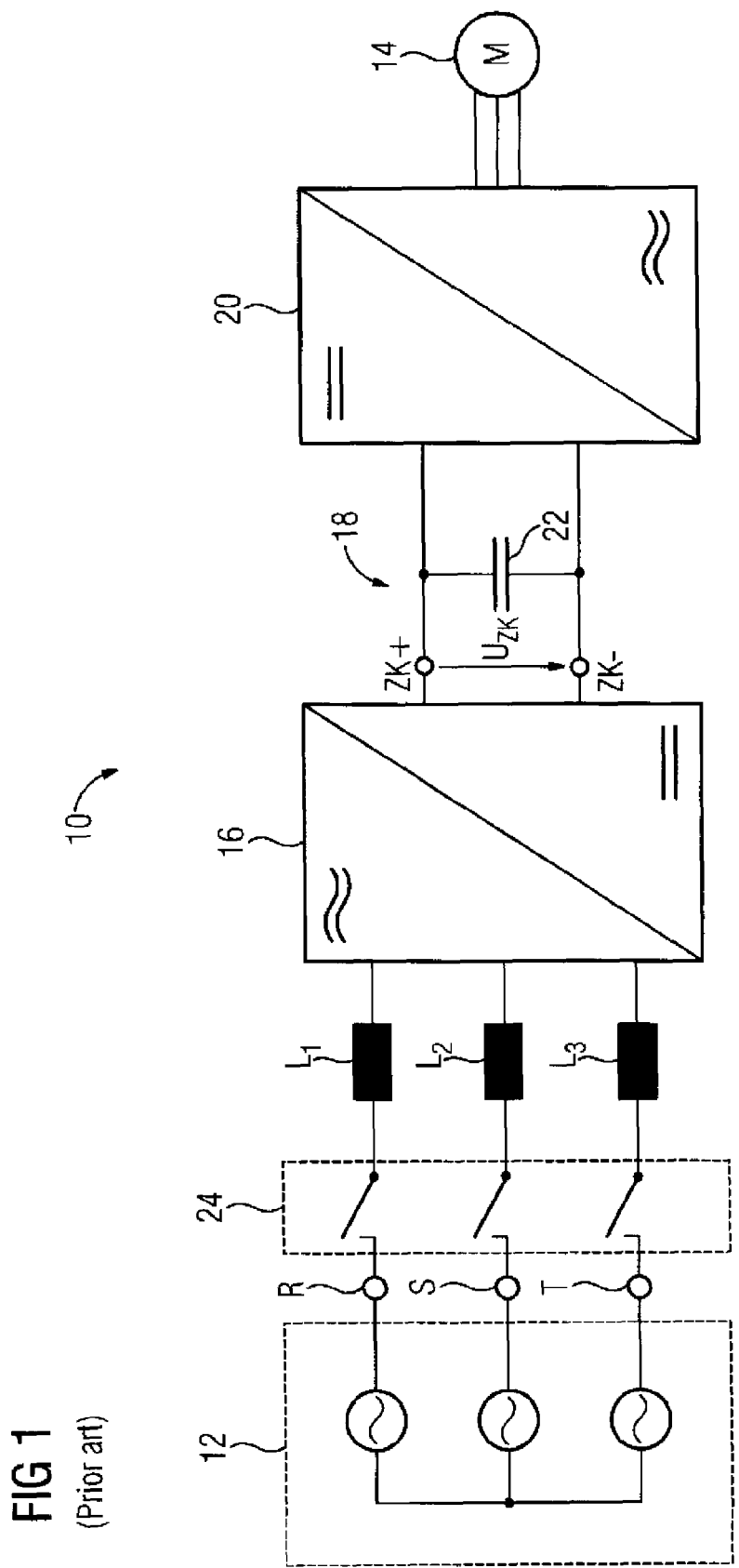
FIG. 1 shows a block diagram of a frequency converter according to the prior art, with which an electrical machine is operated on a supply system.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
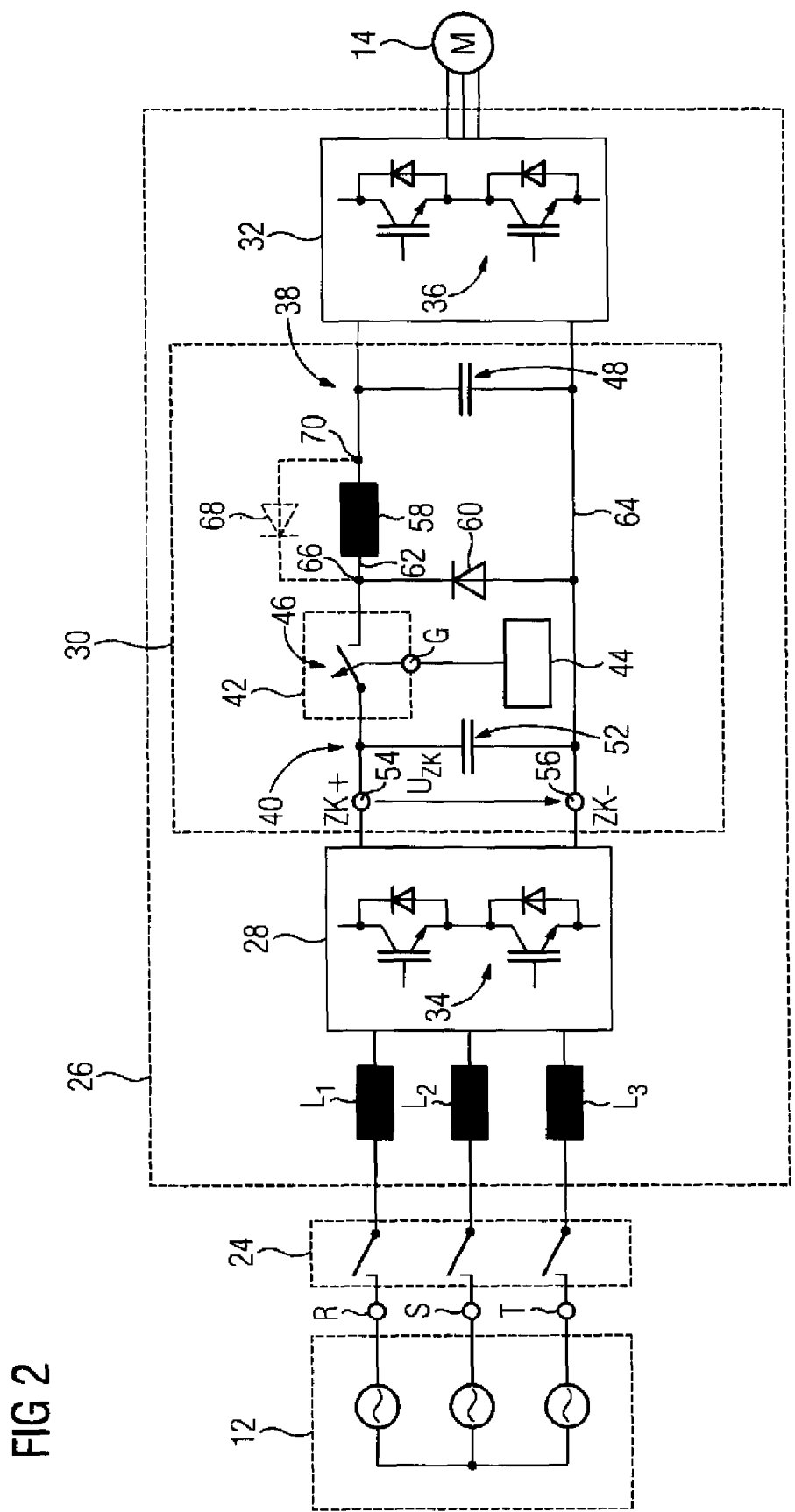
FIG. 2 shows a block diagram of a frequency converter according to an embodiment of the frequency converter according to the present invention.

Turning now to the drawing, and in particular to FIG. 2, there is shown a frequency converter 26 that is connected via a main contactor 24 to phases R, S, T of a supply system 12. An electrical machine 14 is connected to the frequency converter 26. The supply system 12, the main contactor 24 and the electrical machine 14 shown in FIG. 2 correspond to the elements shown in FIG. 1, having identical reference numbers. In this case these elements are not therefore explained again.

In the frequency converter 26, an AC-DC converter 28 is connected to an inverter 32 via a DC link 30.

The AC-DC converter 28 can be configured in the known manner. In the illustrated example, for rectifying the alternating voltages existing between the phases R, S, T, it has three half-bridges, of which, for the sake of clarity, only one half-bridge 34 without additional interconnecting elements is shown in FIG. 2. The AC-DC converter 28 can also be operated as an inverter for feeding electrical energy into the supply system 12.

The inverter 32 can likewise be configured in the known manner. In the present example it contains three half-bridges, of which only one half-bridge 36 (without interconnecting elements) is shown in FIG. 2. In this case the inverter 32 can be operated as an inverter and as a rectifier.

Chokes $L_1$, $L_2$, $L_3$, embodied as commutation inductors, are connected on the supply side upstream of the AC-DC converter 28.

A inverter-side section 38 of the DC link 30 and an infeed-side section 40 are interconnected via a switching device 42. A control input G of a Si transistor 46 of the switching device 42 is coupled to a control device 44. The infeed-side section 40 and the inverter-side section 38 of the DC link 30 are coupled together via the Si transistor 46. The control device 44 controls a transfer resistance of the Si transistor 46 by generating an appropriate control voltage at the control input G. Here the Si transistor 46 is a self-blocking component. An SiC MOSFET, an SiC JFET or a cascode circuit comprising a MOSFET and a JFET can also be used instead of the Si transistor 46, for example.

A DC link capacitor 48 is located in the inverter-side section 38. In the example shown, the capacitance of the DC link capacitor 48 can be higher than 1 mF. Instead of a single DC link capacitor 48, several capacitors can also be provided to supply the DC link inductance.

Busbars of the DC link are coupled together capacitively via a commutation capacitor 52 in the infeed-side section 40. The commutation capacitor 52 can be a ceramic or a foil capacitor. In this example the capacitance of the commutation capacitor 52 is less than 5 μF. However, it is generally chosen according to a total power which can be conducted via the frequency converter 26, with it preferably being less than 10 percent of the capacitance of the DC link capacitor 48.

The capacitance value of the DC link capacitor 48, that is to say the DC link capacitance, is of such a magnitude that when the main contactor 24 is closed, the half-bridge 34 (and the remaining half-bridges of the AC-DC converter 28) would be damaged if the charging current of the DC link capacitor 48 were not limited. In the frequency converter 26, the DC link capacitor 48 is charged in a pre-charging phase with a charging current whose magnitude does not exceed a critical value. At the same time the control unit 44 sets the control voltage at the control input G so that the magnitude of the charging current of the DC link capacitor 48, flowing through the Si transistor 46 is limited accordingly.

The pre-charging of the DC link 30 can be realized in a clocked manner. For this, the Si transistor 46 is initially switched into a blocking state, so that the inverter-side section 38 of the DC link 30 is electrically isolated from the AC-DC converter 28. The main contactor 24 is then closed, so that the AC-DC converter 28 produces a rectified voltage $U_{zK}$ at the DC link-side terminals 54, 56. In this case the current draw of the commutation capacitor 52 is limited only by the commutation capacitance of the chokes $L_1$, $L_2$, $L_3$. Since the commutation capacitance of the commutation capacitor 52 is comparatively small, this is rapidly charged up to the rectified value of the supply voltage. Therefore, despite the hard, that is to say abrupt connection of the commutation capacitor 52 to the supply system 12, the mean magnitude does not exceed a value that is critical for the AC-DC converter 28. As the Si transistor 46 is in the off state during this process, the DC link capacitor 48 remains uncharged.

For clocked pre-charging of the DC link capacitor 48, a clocked control signal whose pulse-no-pulse times can be chosen as required and according to the magnitude of the DC link capacitance, is produced by the control unit 44 at the control input G. The Si transistor 46 is switched in a pulsed or abrupt manner to a conducting state by the control signal, so that electrical charge is transferred from the commutation capacitor 52 via the Si transistor 46 into the DC link capacitor 48.

The recharging current flowing here is limited by a choke 58. It is therefore possible to switch the Si transistor 46 to a fully conducting state, even with a very low parasitic inductance of the commutation capacitor 52 and of the DC link capacitor 48, and with a lower ESR (equivalent series resistance) of these two capacitors. Due to the limited recharging current, the power dissipation converted in the Si transistor 46 remains so small that the Si transistor 46 is not damaged.

During the ON time in the course of one recharging cycle the Si transistor 46 can be constantly switched into a conducting state or opened only for a short time repeatedly in each case, for example at a switching frequency of 1 kHz to 20 kHz. The first recharging cycle is ended after a specific ON time by again permanently switching the Si transistor 46 into the blocking state. As a result, the commutation capacitor 52 is charged up again with electrical energy from the supply system 12 via diodes of the half-bridges of the AC-DC converter 28, that is to say a second recharging cycle is started.

A freewheeling diode 60 freewheels the choke 58 after each opening of the Si transistor 46. For this, the freewheeling diode 60 is connected between two busbar branches 62, 64 of the DC link 30. In the example shown, the freewheeling diode 60 connects the negative potential busbar branch 64 to a switch-side terminal 66 of the choke 58 in the positive potential busbar branch 62. The freewheeling current can flow between the DC link capacitor and the freewheeling diode since the DC link capacitor and the freewheeling diode are, on the one hand, jointly connected to one of the busbar branches and on the other hand are coupled via the choke.

So many recharging cycles are carried out until a desired pre-charging voltage is obtained at the DC link capacitor 48. This can be the rectified value of the supply voltage, for example. After this pre-charging voltage threshold value has been obtained, the Si transistor 46 is permanently switched to a conducting state, so that the lowest possible voltage is dropped across it. The losses occurring at the Si transistor 46 in the resulting following operating phase are therefore comparatively small.

Instead of clocked pre-charging, the Si transistor 46 can be operated for the recharging of the electrical energy as well as for a controlled current source. In addition to this, it is only partly powered up so that it is actually in a conducting state but the voltage dropped across it is sufficiently high in order to limit the load current in the required manner.

During the pre-charging, the control signal for the control input G can have a permanently specified characteristic. However, a controlled operation is also possible, in which the control signal, for example the pulse-no-pulse periods of a square-wave signal in the clocked mode, is set according to a measured variable. For example, a charging state of the DC link capacitor 48 can be determined for this. For generator operation of the electrical machine 14, the choke 58 can be optionally shunted by a diode 68 which can connect a capacitor-side terminal 70 of the choke 58 to the switch-side terminal 66.

Two further advantageous circuit variants of a frequency converter are described with reference to FIG. 3 and FIG. 4. In this case, in FIG. 3 and FIG. 4, elements which in their mode of operation correspond to elements which have been explained in conjunction with FIG. 1 and FIG. 2, have identical reference numbers to those in FIG. 1 or FIG. 2.

Figure 3:
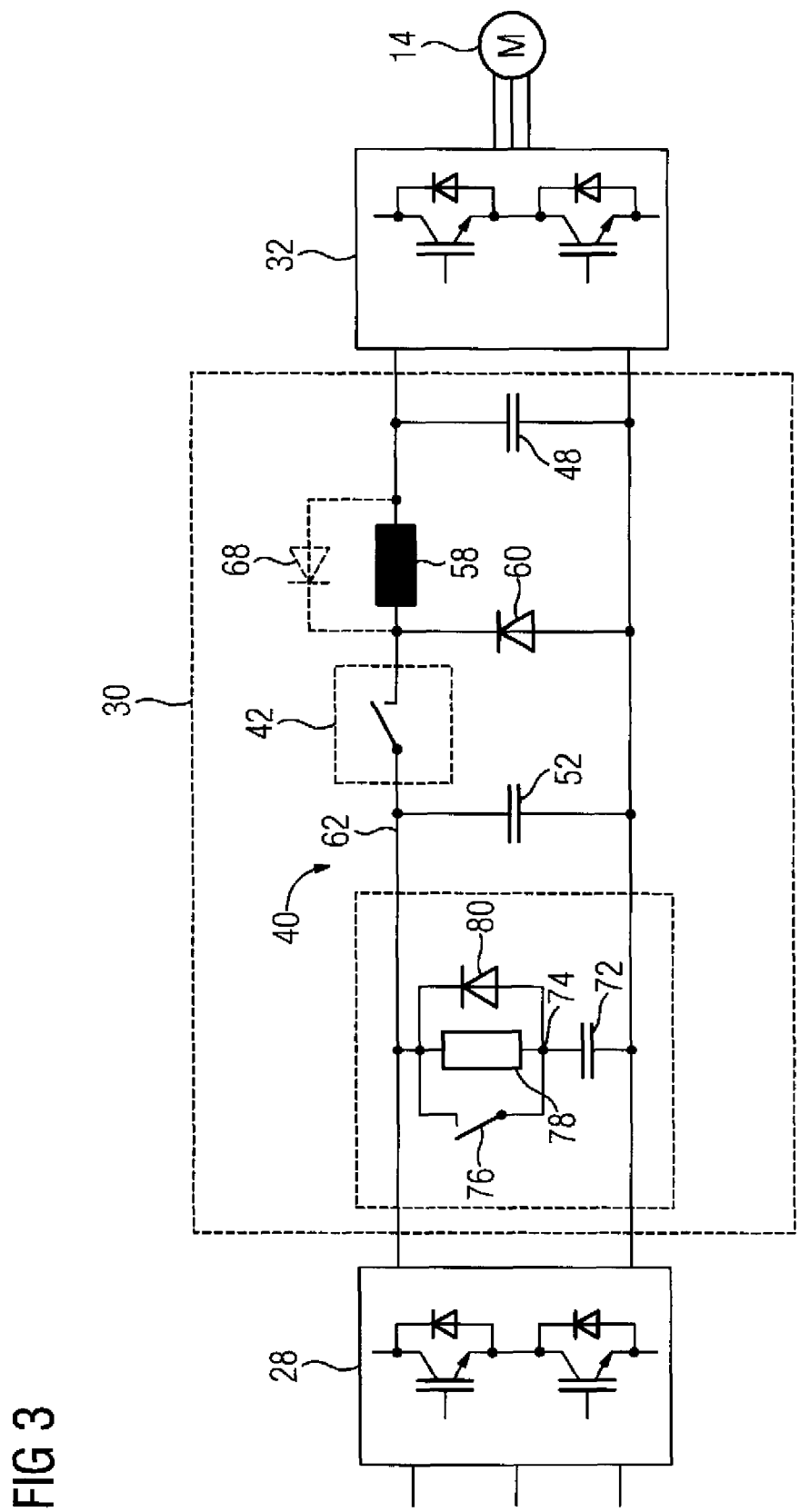
FIG. 3 shows a block diagram of a frequency converter according to a further embodiment of the frequency converter according to the present invention, with commutation capacitor connected.

FIG. 3 shows a DC link 30 in which an additional commutation capacitor 72 is provided parallel to a commutation capacitor 52 in an infeed-side section 40. The additional commutation capacitor 72 can be connected into the circuit as required. In addition, a terminal 74 of the commutation capacitor 72 is connected to a busbar branch 62 via a switch 76, for example an electromechanical or electrical switch. Optionally an electrical resistor 78 and/or a discharge diode 80 for the commutation capacitor 72 can be connected in parallel with the switch 76.

Figure 4:
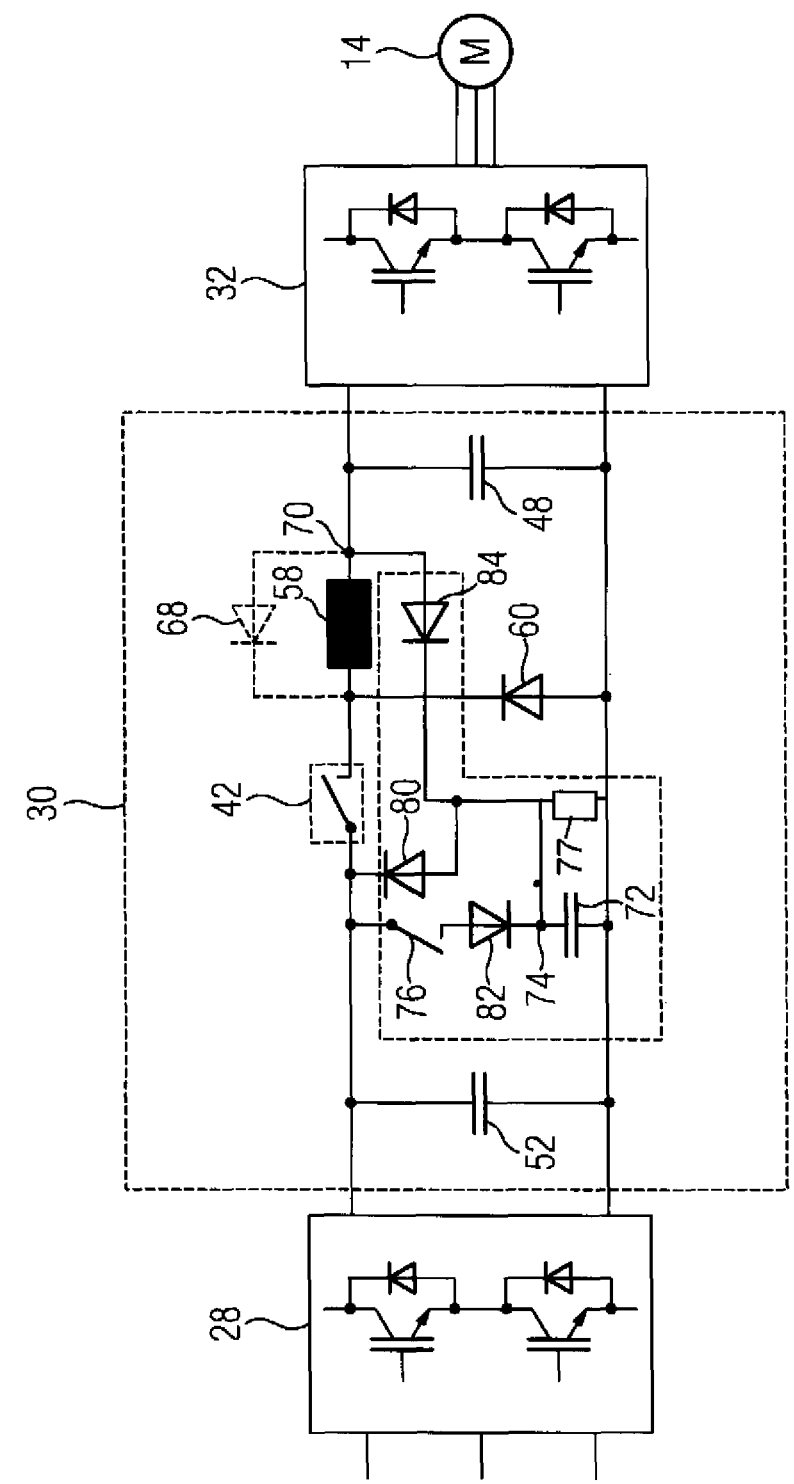
FIG. 4 shows a block diagram of a frequency converter according to a further embodiment of the frequency converter according to the present invention, which can be pre-charged via a choke.

FIG. 4 shows a DC link 30 in which an additional commutation capacitor 72, which can be connected into the circuit via a switch 76, is likewise provided. Current flow from the commutation capacitor 72 back to the switch 76 is blocked by a diode 82. A charging diode 84 connects a capacitor-side terminal 70 of a choke 58 to a terminal 74 of the commutation capacitor 72, via which the commutation capacitor 72 is also coupled to the switch 76. In one embodiment, at least one discharge resistor 77 is connected in parallel with the commutation capacitor 72.

Provision is made in the illustrated examples for the switch of the switching device 42 to be opened in the event of a fault (for example a short-circuit in the DC link). The current from the AC-DC converter 28 then commutates on the commutation capacitor 52. If its capacitance is insufficient to take up the energy stored in the commutation chokes L1 to L3, so that the voltage $U_{ZK}$ at the commutation capacitor 52 exceeds a limiting value, then the switching device 42 can briefly conduct (for example for less than 1 second, in particular less than 100 ms), in order to reduce the voltage $U_{ZK}$ until it again falls below a specified value, for example the limiting value. This is then repeated until the voltage at the commutation capacitor 52 is permanently below the limiting value. The short-term through-connection of the switching device 42 in the event of a fault is non-critical for the half-bridge 34 of the AC-DC converter 28 and also for the switching device 42 itself, as long as their maximum short-circuit times are not exceeded.

Additionally, if necessary the infeed-side commutation capacitance can be increased by connecting the additional commutation capacitor 72.

The examples illustrate how, with a choke 58 in the DC link 30 of a frequency converter 26, a switch, for example an Si transistor, can be operated during pre-charging of a DC link capacitor 48 with a slower clock rate than without a choke, since the current rise is limited by the choke 58. The control circuit of the switching unit 44 can therefore be configured in a considerably less complicated and thus more economical manner. In addition, a suitable Si transistor 46 can be used instead of a faster switching SiC transistor. The recharging current and therefore, by and large, the DC link charging current can be set by selecting the inductance of the commutation capacitor 72.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A frequency converter for operating an electrical machine on an electrical supply system, comprising:
an AC-DC converter having an AC input connected to the electrical supply system and a DC output,
an inverter having a DC input and an AC output connected to a load, and
a DC link having a first circuit branch and a second circuit branch interconnecting the DC output of the AC-DC converter and the DC input of the inverter, wherein the DC link comprises
a DC link capacitor connecting the first circuit branch and the second circuit branch across the DC input of the inverter and a first commutation capacitor,
wherein the first circuit branch comprises a choke having a first terminal connected to a DC input terminal of the inverter and a second terminal connected to a first terminal of a freewheeling diode and to a first terminal of a semiconductor switch, wherein a second terminal of the semiconductor switch is connected to a DC terminal of the AC-DC converter in the first circuit branch, wherein a second terminal of the freewheeling diode is connected to the second circuit branch,
wherein the first commutation capacitor connects the second terminal of the semiconductor switch with the second circuit branch, and
wherein the semiconductor switch is configured to control a magnitude of an electrical current flowing from the AC-DC converter into the DC link capacitor in accordance with a control signal and to also interrupt the electrical current flowing from the DC link to the inverter in the event of a fault,
the frequency converter further comprising a second commutation capacitor having a first terminal connected to the second circuit branch and a second terminal connected in series to a second switch, with the series connection connecting the first and the circuit branches, and
a fourth diode connected between the second commutation capacitor and the first terminal of the choke, wherein the fourth diode blocks current flow from the first terminal of the choke to the second commutation capacitor.

2. The frequency converter of claim 1, wherein the semiconductor switch comprises a transistor.

3. The frequency converter of claim 2, wherein the transistor is a Si transistor.

4. The frequency converter of claim 1, wherein the semiconductor switch is self-blocking.

5. The frequency converter of claim 1, further comprising a resistor connected in parallel with the second switch.

6. The frequency converter of claim 1, further comprising a second diode connected in parallel with the second switch.

7. The frequency converter of claim 1, further comprising a third diode connected in series with the second switch so as to block discharging of the second commutation capacitor via the second switch.

8. The frequency converter of claim 1, further comprising at least one discharge resistor connected in parallel with the second commutation capacitor.

9. A method for operating a frequency converter having an AC-DC converter, an inverter and a DC link interconnecting a DC output of the AC-DC converter with a DC input of the inverter, comprising the steps of:

coupling the AC-DC converter to a supply system;

in a pre-charging phase, charging a DC link capacitor via a semiconductor switch, when the semiconductor switch is conducting current, with electrical energy from the supply system by controlling a magnitude of a charging current flowing through the semiconductor switch and a choke with a control signal supplied at a control input of the semiconductor switch, and charging the DC link capacitor via a freewheeling diode when the semiconductor switch is not conducting, and during an operating phase, with the semiconductor switch, interrupting a short-circuit current flowing from the supply system to the DC link capacitor and interrupting the electrical current flowing from the DC link to the inverter in the event of a fault, wherein the DC link capacitor is charged in the pre-charging phase by transferring electrical energy from a commutation capacitor to the DC link capacitor in successive transfer cycles, wherein in each transfer cycle, when the semiconductor switch is in a blocking state, the commutation capacitor is charged from the supply system, and when the semiconductor switch is in a conducting state, the DC link capacitor is charged from the commutation capacitor.

10. The method of claim 9, wherein the control signal is generated by a control device in accordance with a measured variable which is dependent upon an operating state of the frequency converter.

11. The method of claim 10, wherein the measured variable is a voltage drop across the DC link capacitor.

12. The method of claim 9, wherein the control device controls the magnitude of the charging current with a two-step control method.

13. The method of claim 9, wherein the control signal is a clocked signal.

14. The method of claim 9, wherein the control signal is a pulse-width-modulated signal.

15. The method of claim 9, further comprising
interrupting current flow from the AC-DC converter to the DC link capacitor and to the inverter by opening the semiconductor switch in order to abort an operating phase,
measuring a voltage drop across the commutation capacitor or the semiconductor switch, and
reclosing the semiconductor switch when a magnitude of the measured voltage exceeds a predetermined threshold value.

16. The frequency converter of claim 1, wherein the semiconductor switch is configured and connected in the DC link to interrupt the electrical current flowing to the inverter.

17. The frequency converter of claim 1, wherein the choke is shunted by a first diode which is connected so as to conduct electrical current in a direction from the inverter to the AC-DC converter.

* * * * *

UNITED STATES PATENT AND TRADEMARK OFFICE
CERTIFICATE OF CORRECTION

PATENT NO. : 9,318,969 B2
APPLICATION NO. : 13/930561
DATED : April 19, 2016
INVENTOR(S) : Dillig et al.

It is certified that error appears in the above-identified patent and that said Letters Patent is hereby corrected as shown below:

In the claims,

Column 10, claim 1, line 33, please correct "capacitor haying a first" to read --capacitor having a first--.

Signed and Sealed this
Fourteenth Day of June, 2016

Michelle K. Lee
*Director of the United States Patent and Trademark Office*